United States Patent
Feroni et al.

(10) Patent No.: US 12,545,160 B2
(45) Date of Patent: Feb. 10, 2026

(54) SEAT TRIM ATTACHMENT SYSTEM

(71) Applicant: Adient US LLC, Plymouth, MI (US)

(72) Inventors: Ryan Feroni, Plymouth, MI (US); Chandrakanth Kundargi, Canton, MI (US); Manoj Sabale, Satara (IN); Mauricio Espinosa, Van Buren Township, MI (US)

(73) Assignee: Adient US LLC, Plymouth, MI (US)

( * ) Notice: Subject to any disclaimer, the term of this patent is extended or adjusted under 35 U.S.C. 154(b) by 167 days.

(21) Appl. No.: 18/596,706

(22) Filed: Mar. 6, 2024

(65) Prior Publication Data

US 2024/0300392 A1    Sep. 12, 2024

Related U.S. Application Data (60) Provisional application No. 63/488,793, filed on Mar. 7, 2023.

(51) Int. Cl.
*B60N 2/02*   (2006.01)
*B60N 2/58*   (2006.01)

(52) U.S. Cl.
CPC ......... *B60N 2/5825* (2013.01); *B60N 2/0284* (2013.01)

(58) Field of Classification Search
CPC ............................ B60N 2/0284; B60N 2/5825
See application file for complete search history.

(56) References Cited

U.S. PATENT DOCUMENTS

| | | | | |
|---|---|---|---|---|
| 7,669,928 B2 * | 3/2010 | Snyder | ................. | B60N 2/0284 297/284.11 X |
| 8,128,167 B2 * | 3/2012 | Zhong | ..................... | B60N 2/62 297/284.11 |
| 9,365,142 B1 * | 6/2016 | Line | ....................... | B60N 2/62 |
| 10,046,681 B2 * | 8/2018 | Line | ..................... | B60N 2/0284 |
| 10,081,279 B2 * | 9/2018 | Line | ....................... | B60N 2/58 |
| 10,286,818 B2 * | 5/2019 | Line | ....................... | B60N 2/99 |
| 10,308,143 B2 * | 6/2019 | Abe | ......................... | B60N 2/02 |
| 10,449,878 B2 * | 10/2019 | Sala | ..................... | B60N 2/0224 |
| 10,611,270 B2 * | 4/2020 | Vanfossen | ............ | B60N 2/0027 |
| 10,625,646 B2 * | 4/2020 | Kondrad | ............... | B60N 2/929 |
| 10,640,011 B2 * | 5/2020 | Anzenberger | ....... | B60N 2/0284 |
| 10,710,472 B2 * | 7/2020 | Tsukamoto | .......... | B60N 2/5825 |
| 10,717,371 B2 * | 7/2020 | Tsukamoto | ............ | B60N 2/986 |
| 10,717,372 B2 * | 7/2020 | Okubo | ..................... | B60N 2/62 |
| 10,773,624 B2 * | 9/2020 | Morrow | .................. | B60N 2/62 |
| 10,793,025 B2 * | 10/2020 | Tsukamoto | ............ | B60N 2/986 |
| 10,800,292 B2 * | 10/2020 | Tsukamoto | .............. | B60N 2/68 |
| 10,807,502 B2 * | 10/2020 | Tsukamoto | .......... | B60N 2/5825 |
| 11,325,509 B2 * | 5/2022 | Panchani | ............. | B60N 2/0284 |

(Continued)

FOREIGN PATENT DOCUMENTS

WO    WO-2010057335 A1 *    5/2010    ........... B60N 2/0284

*Primary Examiner* — Rodney B White
(74) *Attorney, Agent, or Firm* — Marshall & Melhorn, LLC (57) ABSTRACT

A seat trim attachment system may have a seat adjuster that has an upper, intermediate, and lower portion. The seat adjuster may be connected to a seat base to assist with the movement of a lower seat cushion. A trim adjuster made up of one layer of an elastic material may be connected to an end of a seat trim. A trim flange with apertures may extend along the lower portion and be used as a retainer. A trim compensator made up of a connector portion, transition portion, and first and second side portions may be used to keep the trim taut.

18 Claims, 4 Drawing Sheets

(56) References Cited

U.S. PATENT DOCUMENTS

| | | | |
|---|---|---|---|
| 11,420,546 B2 * | 8/2022 | Oomen | A47C 1/023 |
| 11,458,867 B2 * | 10/2022 | Gomez | B60R 22/20 |
| 11,654,808 B2 * | 5/2023 | Oomen | B60N 2/0284 |
| | | | 297/452.5 |
| 11,981,232 B2 * | 5/2024 | Riva | B60N 2/5816 |
| 2025/0001919 A1 * | 1/2025 | Ferrari | B60N 2/5816 |
| 2025/0033534 A1 * | 1/2025 | Bashir | B60N 2/7094 |
| 2025/0242729 A1 * | 7/2025 | Frotz | B60N 2/0284 |

* cited by examiner

SEAT TRIM ATTACHMENT SYSTEM

FIELD

An attachment system for seat trim is provided. The seat may be for, but is not limited to a vehicle seat, including a land vehicle seat.

BACKGROUND

Seat trim, which is sometimes called a covering, is used to provide an attractive and comfortable enclosure for seats. Among other purposes, seat trim is designed to enclose the inner components and functionality of a seat. Seats, however, have become increasingly complex and may include a wide variety of motions to provide a comfortable experience for the user. The wide variety of motions must be accommodated by the seat trim which makes trimming the seat more difficult.

One motion provided by some seats relates to adjusting the length of the lower seat cushion. By adjusting the length of the lower seat cushion, the seat might be tailored to the thigh length of the user, which can make the seat more comfortable.

This adjustment, however, makes it difficult to accommodate slack in the seat trim when the length of the lower seat cushion is reduced and to provide extra seat trim when the length of the lower seat cushion is increased all the while keeping the seat trim for the entire seat in the same taut condition.

Prior art trim adjustment devices exist, but they are overly complex with too many failure modes and they are difficult to manufacture and install on the seat, which drives up expense.

In view of the disadvantages associated with known seats and their trim adjustment devices, it would be advantageous to have a seat trim adjustment device that was simple, robust and highly effective at accommodating seat adjustments.

SUMMARY

In one aspect, a seat trim attachment system may have a seat adjuster that has an upper, intermediate, and lower portion and is connected to a seat base frame to assist with fore and aft movement of a lower seat cushion. The device may also have a trim adjuster that has one layer of elastic material. The device may also have a trim flange with apertures extending therethrough that acts as a retainer and extends transverse the lower portion and parallel the intermediate portion. The device may also have a trim compensator made up of a connector portion, transition portions, and first and second side portions, that is used to keep the trim taut as the seat cushion moves.

In another aspect, the upper portion may be parallel a seat pan. The upper portion may also extend downwardly to the intermediate portion in a curvilinear fashion. The intermediate portion may extend downwardly to the lower portion to complete a "C" shape.

In another aspect, the trim adjuster may be connected to an end portion of a seat trim via high frequency welding, adhesive, sewing, and/or fasteners under the seat base.

In another aspect, the seat trim adjuster may extend the length of the lower portion of the seat adjuster.

In another aspect, the seat trim adjuster may extend or retract when the length of the lower seat cushion is extended or retracted.

In another aspect, the apertures of the trim flange may be equally spaced across the trim flange and may be of equal size and shape.

In another aspect, the apertures of the trim flange may be open to a top edge portion of the trim flange.

In another aspect, the trim adjuster may be partially extended about the trim flange such that it overlaps the apertures and folds around the trim flange.

In another aspect, one or more pins, made up of a head and body portion, may be selectively located through the trim adjuster and into the apertures of the trim flange to secure the trim adjuster to the trim flange.

In another aspect, a friction fit may fix the body portion of the pins to the apertures of the trim adjuster, securing the trim adjuster between the head portion of the pin and the trim flange.

In another aspect, the connector portion of the trim compensator may be rigid to resist compression or expansion.

In another aspect, the connector portion of the trim compensator may extend parallel and along the length of the trim flange.

In another aspect, the transition portions of the trim compensator may be connected to each end of the connector portion of the trim compensator. The transition portions may extend downwardly toward the lower portion of the seat adjuster in a curvilinear direction.

In another aspect, the first side portion of the trim compensator and second side portion of the trim compensator may be made up of lower, middle, and upper legs.

In another aspect, the lower leg of each side portion may extend toward the intermediate portion of the seat adjuster and arc upward to the middle leg.

In another aspect, the middle leg of each side portion may be at least partially located within a trim pocket. The middle leg may also extend parallel the intermediate portion of the seat adjuster and may be transverse the lower legs.

In another aspect, the middle leg of each side portion may transition in an arc to the upper leg of each side portion. This transition will complete a "C" shape between the lower, middle, and upper legs of each side portion.

In another aspect, the upper leg of each side portion may be at least partially located within the trim pocket and may be parallel the lower leg.

In another aspect, each side portion may have two fixed ends, allowing the rest of the side portion to move within the trim pockets.

In another aspect, the seat trim attachment system may have a seat adjuster that has an upper, middle, and lower portion. The device may also have a trim flange that is attached to the lower portion of the seat adjuster. The device may also have a trim adjuster that is elastically deformable. The trim adjuster may have a first end portion that is attached to the trim flange and a second end portion that is attached to a trim. The device may also have a structure designed to attach the trim adjuster to the seat adjuster. The device may also have a trim compensator that is movably connected to the trim at least within one trim pocket.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION OF THE PREFERRED EMBODIMENTS

The presently disclosed subject matter may assume various alternative orientations and step sequences, except where expressly specified to the contrary. The specific assemblies and systems illustrated in the attached drawings, and described in the following specification are simply exemplary embodiments of the concepts. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 1:
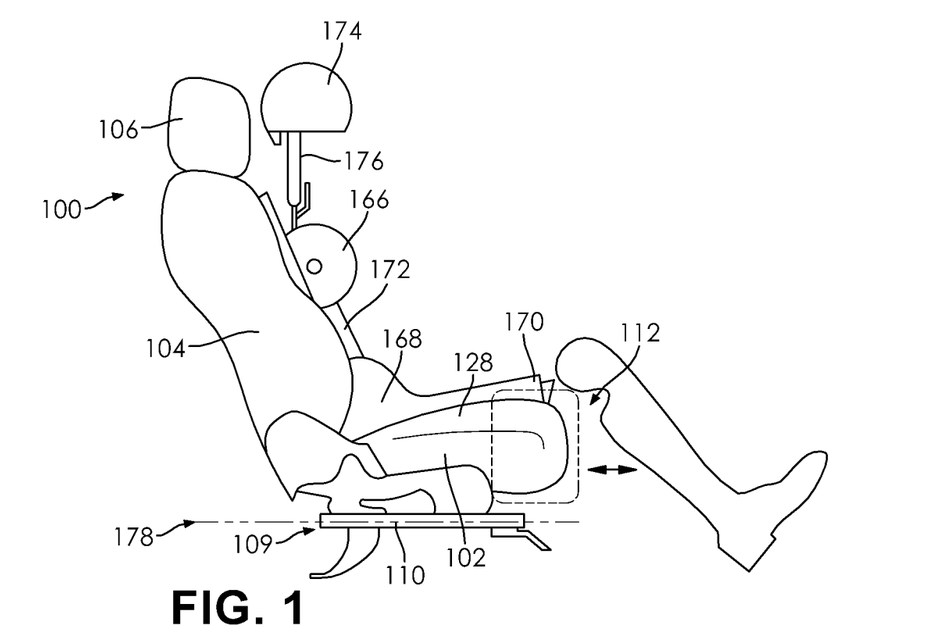
FIG. 1 is a schematic side view of one embodiment of a seat with an occupant where the seat cushion is in a retracted condition.
Figure 2:
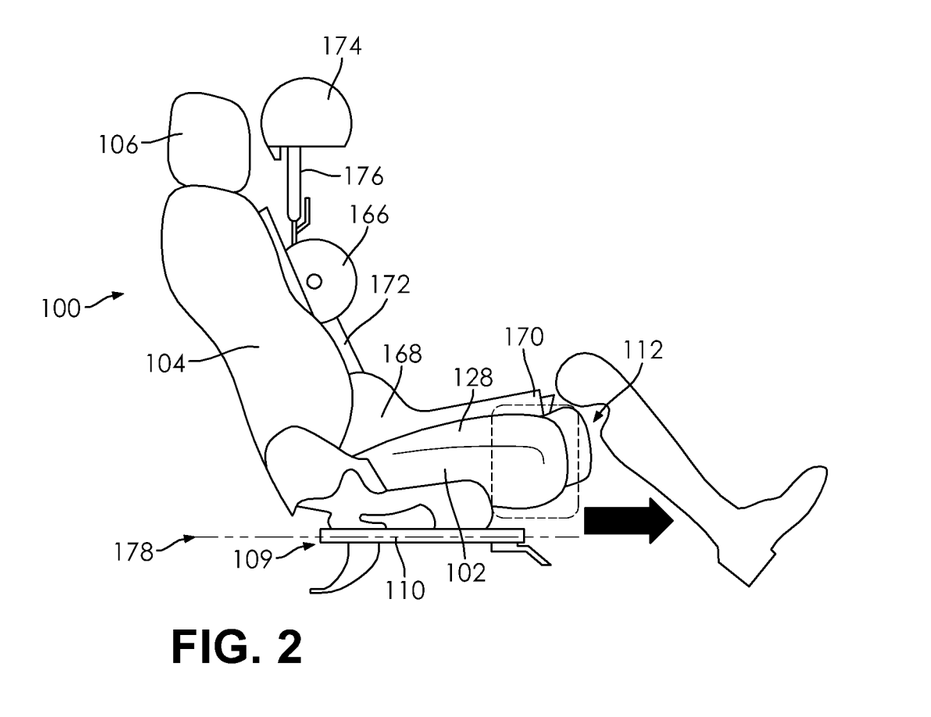
FIG. 2 is a schematic side view of the seat from FIG. 1 where the seat cushion has been lengthened compared to FIG. 1.

FIGS. 1 and 2 show a seat system 100 according to an embodiment of the presently described subject matter. The seat system 100 may be for a motor vehicle but the system may be used in other applications as well.

The seat system 100 may comprise a seat base assembly 102, a seat back assembly 104, and a headrest assembly 106. The seat back assembly 104 may be coupled to the seat base assembly 102 and the headrest assembly 106. In certain embodiments, the seat base assembly 102 may be movable relative to a floorboard of the vehicle, the seat back assembly 104 may be movable relative to the seat base assembly 102, and the headrest assembly 106 may be movable relative to the seat back assembly 104. The seat base assembly 102 may be configured to support a buttock portion 168 and leg portion 170 of an occupant 166. The seat back assembly 104 may be configured to support a back region 172 of the occupant 166 and the headrest assembly 106 may be configured to support the head 174 and/or neck 176 of an occupant 166.

The seat system 100 may also include a seat frame 109 comprising a seat base frame portion 110, a seat back frame portion (not shown), and a headrest frame portion (not depicted). It is understood that the frame portions may be coupled together in a movable manner as noted above. It is further understood that any suitable material may be employed to produce the frame portions as desired. For example, each of the frame portions may be formed from a rigid metal material.

FIG. 1 depicts one embodiment where the seat base assembly 102 is in a retracted, or reduced length position. FIG. 2 depicts one embodiment where the seat base assembly 102 is in an extended or greater length position. The difference in these positions may be such as generally along a longitudinal axis 178 of the seat base assembly 102. While the longitudinal axis 178 is mentioned, it must be appreciated that based on the orientation of the seat the extension can be in any direction with respect to the vehicle. The seat base assembly 102 may be comprised of a cushion length adjustment assembly 112 to provide the noted positions, as well as intermediate positions.

FIGS. 1 and 2 also partially schematically depict one embodiment of the seat base frame portion 110. Certain portions of the seat base frame portion 110 may be fixed with respect to the floorboard and/or the seat system 100. For example, one part of the seat base frame may be fixed to the seat system 100 and another part of the seat base frame may be fixed to the floorboard where the parts may move with respect to one another.

Figure 3:
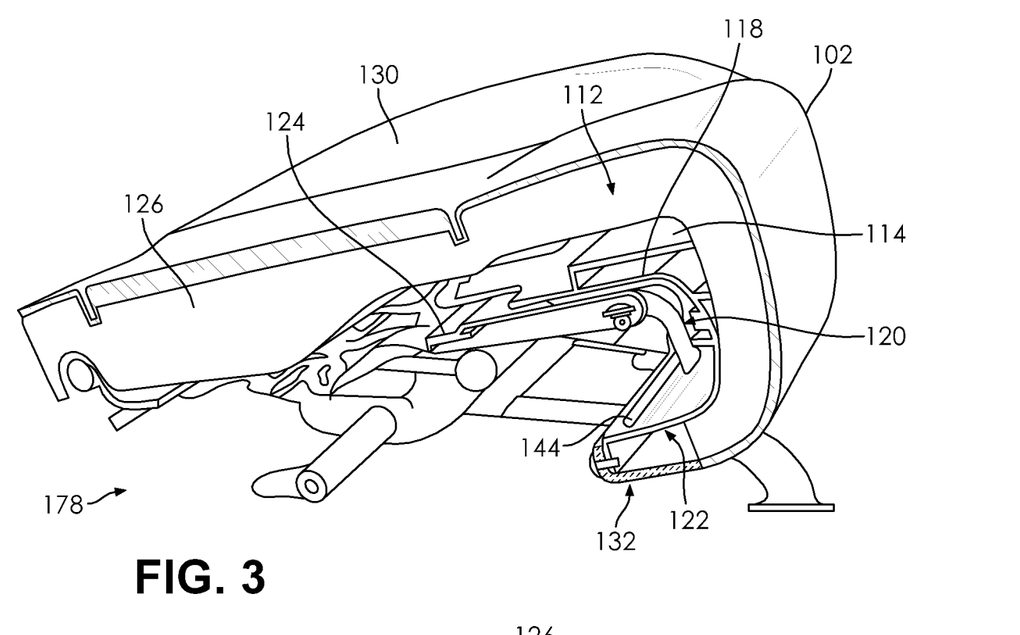
FIG. 3 is a schematic cut-away side view of the seat cushion in the retracted position.
Figure 4:
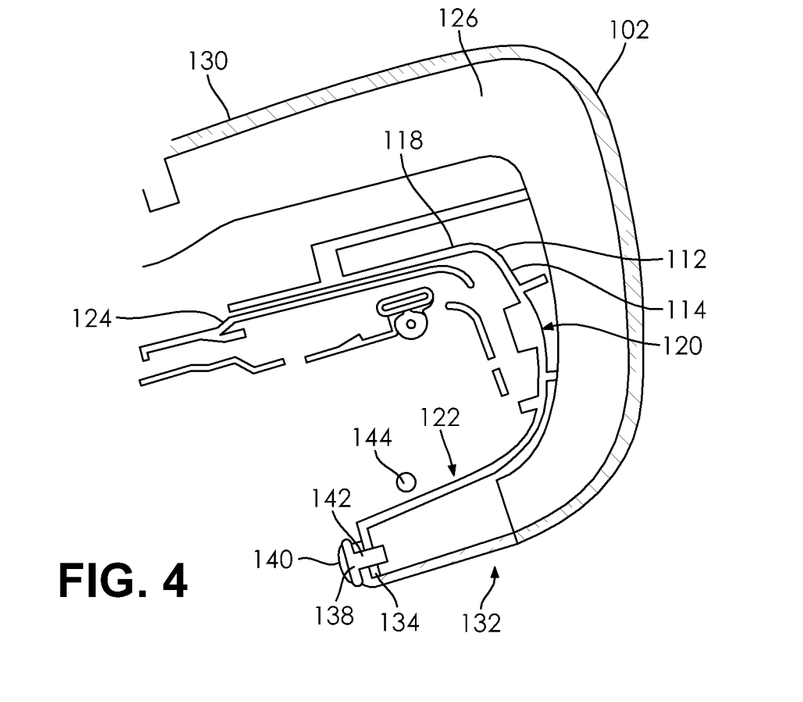
FIG. 4 is a schematic cut-away side view of the seat cushion in the retracted condition.
Figure 5:
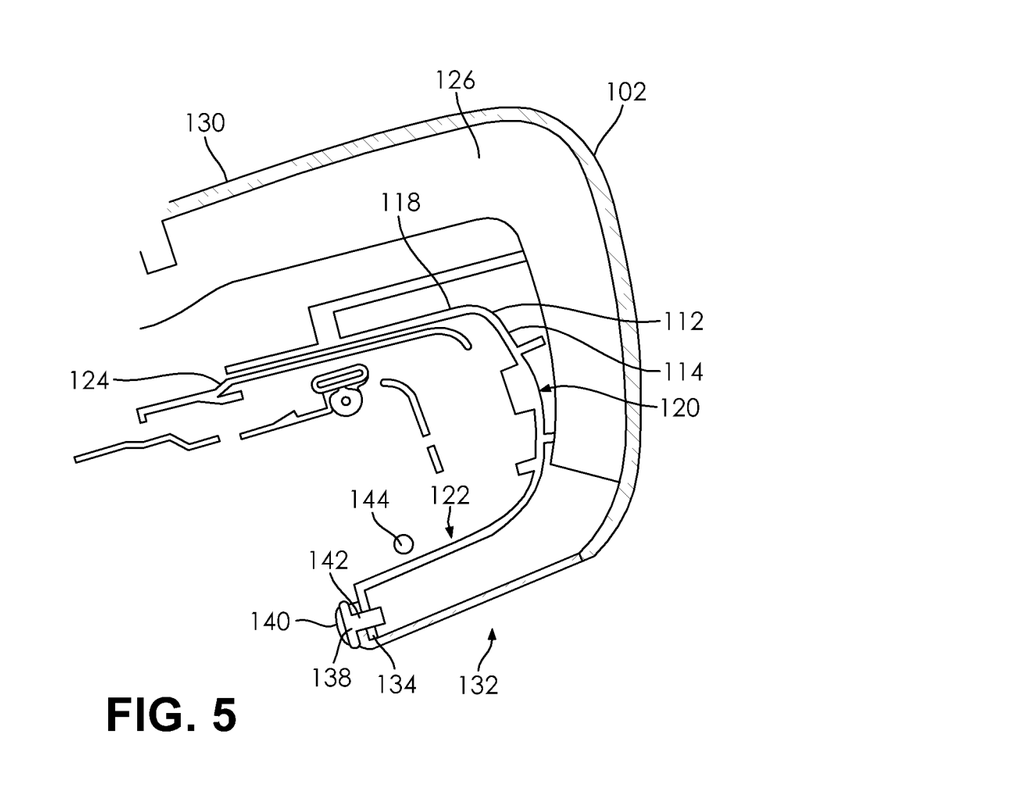
FIG. 5 is a schematic cut-away side view of the seat cushion in the extended condition.
Figure 6:
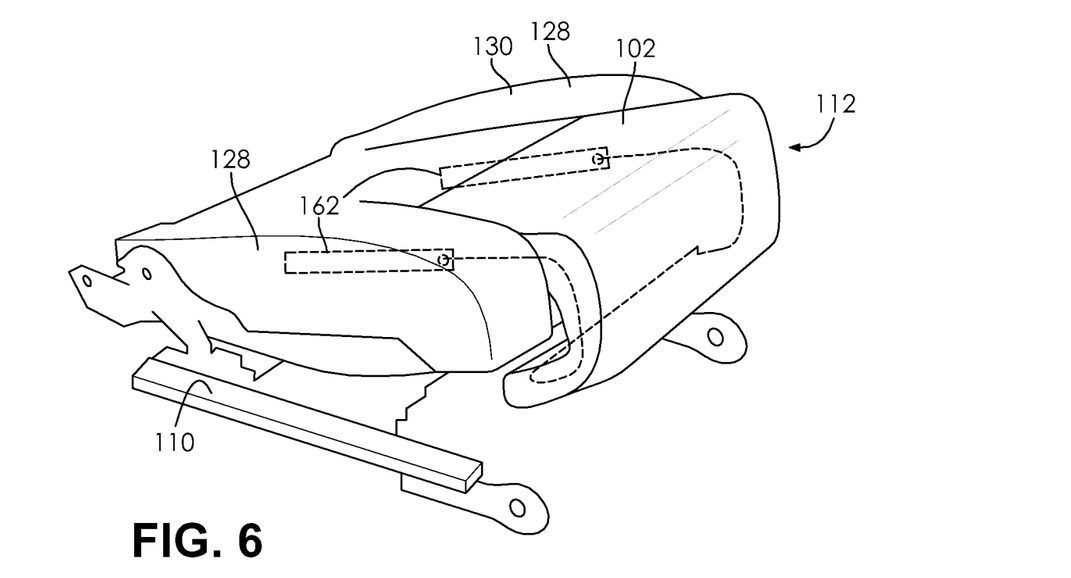
FIG. 6 is a schematic perspective view of the seat cushion.

The cushion length adjuster assembly 112 may be comprised of a seat adjuster 114, which may be connected to the seat base frame portion 110, as shown in FIGS. 3-5. The seat adjuster 114 may assist with fore and aft movement of a front portion of the seat base assembly 102. In this case, the fore direction generally means the forward direction for a vehicle with the seat in the traditional forward-facing direction, and aft may be generally opposite the fore direction. The fore and aft directions may be generally parallel the longitudinal axis 178 of a vehicle in which the seat system 100 may be installed. There are cases, however, where a seat may be positioned in the vehicle so that the occupant 166 faces any direction in the vehicle. In such a case, one can nevertheless appreciate the seat movement described herein.

The seat adjuster 114 may selectively be moved by a variety of structures including but not limited to electric motors, pneumatics and/or hydraulics, which are together called biasing members. In some cases, the biasing members may be fixed to the seat base frame portion 110, and/or a seat pan 124. A portion of the biasing members 116 contacts the seat adjuster 114 to selectively move the seat adjuster 114 at least in the fore and aft directions.

The seat adjuster 114 may be comprised of an upper portion 118, an intermediate portion 120, and a lower portion 122. The seat adjuster 114 may be comprised of metal, plastic, and/or composite materials. The portions may be one piece integrally formed and unitary or they may be two or more pieces that are connected together.

In some cases, the upper portion 118 may extend generally parallel the fixed seat pan 124 and selectively move fore and aft with respect thereto. The upper portion 118 may selectively cantilever off of the seat pan 124 such as in an extended position. In a retracted portion, the upper portion 118 may substantially vertically overlap the seat pan 124.

The intermediate portion 120 may extend from the upper portion 118 in a curvilinear fashion downwardly from the upper portion 118. In some cases, the intermediate portion 120 may extend generally transverse the upper portion 118. The lower portion 122 may extend from the intermediate portion 120. In some cases, the lower portion 122 may extend generally parallel the upper portion 118 so that the upper 118 and lower portions 122 are at least partially vertically overlapping. Some embodiments may have the seat adjuster 114 generally in the shape of a C.

The seat adjuster 114, the seat pan 124 and/or the seat frame portion 109 may support one or more layers of cushioning material 126 thereon. In one embodiment, the cushioning material 126 may be such as a foam material. The foam material may take on different sizes, shapes and thicknesses as needed to provide a shape, structure and comfort to the seat base assembly 102.

By way of one example, as shown in FIG. 3, the cushioning material 126 may extend at least partially about the lower portion 122, the intermediate portion 120 and the upper portion 118. The cushioning material 126 may also extend over and/or around the other seating surfaces, such may include seat bolsters 128 which may bound a central seat area.

A seat trim 130 may be located over the cushioning material 126 in whole or in part. The seat trim 130 may be natural and/or man-made materials in whole or in part. The seat trim 130 typically closely conforms to the cushioning material 126 to provide a generally taut appearance. In some cases, the seat trim 130 may extend across the central seat area, about any seat bolsters 128, about the upper 118, intermediate 120, and lower portions 122 of the seat adjuster 114 as well as into any seams.

In some cases, the trim 130 may be connected to a trim adjuster 132. For example, as may be seen in FIGS. 3-5, a trim adjuster 132 may be connected to an end portion of the trim 130. The connection may be through high frequency welding, adhesive, sewing, and/or fasteners. One such connection may be adjacent the lower portion 122 of the seat adjuster 114. In such a location, the connection may be substantially hidden from view as the connection would be under the seat.

The trim adjuster 132 may be comprised of a material capable of resuming its original shape spontaneously after contraction, dilatation and/or distortion. By way of one example, in one embodiment the trim adjuster 132 may be comprised of one or more lengths of a flexible, elastic fabric, and/or retractable, memory fabric. In one embodiment, the trim adjuster 132 may be comprised of a single layer of elastic fabric. The trim adjuster 132 may extend substantially the length of the lower portion 122 of the seat adjuster 114 as well as the trim adjacent the same general location. The trim adjuster 132 may extend substantially continuously from the connection with the lower portion 122 of the seat adjuster 114 to a trim flange 134 on the lower portion 122 of the seat adjuster 114.

Through its construction, the trim adjuster 132, alone or in combination with other features, extends when the length of the cushion length adjuster assembly 112 is extended while maintaining a taut connection on the trim 130. Additionally, the trim adjuster 132, alone or in combination with other features, retracts when the length of the cushion length adjuster assembly 112 is retracted all the while maintaining a taut connection on the trim 130. The elastic nature of the trim adjuster 132, as well as the structures noted below, may assist in maintaining the taut nature of the trim 130 during extension and retraction.

The trim flange 134 may extend generally transverse the lower portion 122 and/or it may extend generally parallel the intermediate portion 120, which may be appreciated in FIGS. 3-7. The trim flange 134 may extend substantially continuously without interruption along the lateral length of the lower portion 122, except as noted below. The trim flange 134 may only extend a fraction of the height of the intermediate portion 120, such as 10-25% of the height of the intermediate portion 120.

Figure 7:
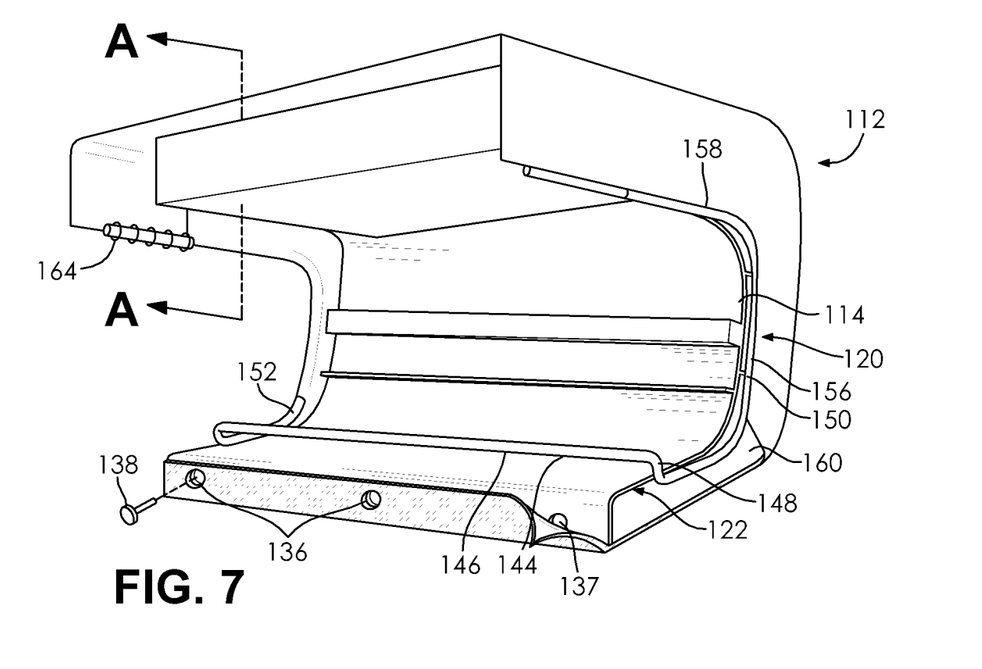
FIG. 7 is a schematic cut-away perspective view of the seat cushion.

The trim flange 134 may have one or more retainer apertures 136 extending therethrough. In some embodiments, there may be three retainer apertures 136 in the trim flange 134, as shown in FIG. 7. The apertures 136 may be generally equally spaced across the trim flange 134 and they be of generally equal size and shape, which may be generally circular.

In one case, the apertures 136 may be fully enclosed by the trim flange 134. In other embodiments, the apertures 136 may be open to a top edge portion of the trim flange 134. The latter embodiment permits a pin 138 (described below) to be slid into the top of the trim flange 134 from above.

The trim adjuster 132 may be at least partially extended about the trim flange 134 such that it overlaps the apertures 136. The trim adjuster 132 may be at least partially folded around the trim flange 134 (such as around the bottom edge of the trim adjuster 132) thanks in part to its flexible nature which allows it to conform to the shape of the trim flange 134 while remaining relatively taut.

One or more pins 138 or fasteners may be selectively located through the trim adjuster 132 via apertures 137 in the trim adjuster 132 and into the apertures 136 of the trim flange 134 to secure the trim adjuster 132 to the trim flange 134. The pins 138 may have a head portion 140 and a body portion 142 where the head portion 140 may have a larger outer diameter than the body portion 142 and the apertures 136. The body portion 142 may be selectively located through the apertures 136 in the trim flange 134. A friction fit between the body portion 142 and the apertures 136 fixes the pin 138 in the apertures 136. The trim adjuster 132 may be secured, such as sandwiched, between the head portion 140 and the trim flange 134.

In the depicted embodiment, the body portion 142 of the pins 138 may extend generally parallel the upper 118 and/or lower portions 122 of the seat adjuster 114. The pins 138 may also be oriented so that their end surfaces generally face toward the intermediate portion 120 of the seat adjuster 114. In other embodiments, the pins 138 may be oriented in other directions and angles with respect to the intermediate portion 120 of the seat adjuster 114.

In some cases, a trim compensator 144 may be provided. The trim compensator 144 may be comprised of a material that may be one piece, unitary and integrally formed or it may be comprised of two or more pieces that are connected together. The compensator 144 may have a generally circular cross-section but other cross-sections may be used as well. The compensator 144 may be substantially solid, or it may be hollow in whole or in part.

The trim compensator 144 may be constructed of a material capable of resuming its original shape spontaneously after contraction, dilatation and/or distortion. By way of one example, in one embodiment the trim compensator 144 may be comprised of elastic tubing, a plastic framework or the like. The trim compensator 144 may be substantially symmetrical about the longitudinal axis 178. The trim compensator 144 may be used to locate the trim 130 on the seat as well as maintain the trim 130 in a preferred tautness.

Figure 8:
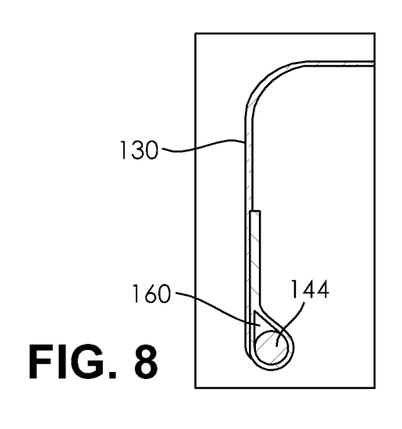
FIG. 8 is a cross-sectional view of one embodiment of a seat pocket along line A-A of FIG. 7.

The trim compensator 144 may have a connector portion 146 and may be at least partially located within a trim pocket 160, as shown in FIG. 8. The connector portion 146 may extend generally parallel the trim flange 134 and the connector portion 146 may substantially extend along the length of the trim flange 134. The connector portion 146 may be relatively rigid, such as resistant to compression or expansion, in the lateral direction.

Transition portions 148 may be connected to each end portion of the connector portion 146. The transition portions 148 may extend generally downwardly toward the lower portion 122 of the seat adjuster 114 from the end portions of the connector portion 146 in a curvilinear direction. The transition portions 148 may have a general S shape.

First and second side portions 150, 152 may connect to each of the transition portions 148, respectively. The first and second side portions 150, 152 may be generally spaced apart from one another at a substantially constant distance due to the connector portion 146. Along their paths the first and second side portions 150, 152 may be generally parallel one another.

Each side portion may be substantially similar so only the first side portion 150 will be described. A lower leg 154 of the first side portion 150 may generally extend forward toward the intermediate portion 120 of the seat adjuster 114. Before it reaches the intermediate portion 120, the first side portion 150 may bend or arc generally upward to a middle leg 156. The middle leg 156 of the first side portion 150 may extend generally parallel the intermediate portion 120. The middle leg 156 may be generally transverse the lower leg 154.

In the region where the middle leg 156 is adjacent the intermediate portion 120, the middle leg 156 may be at least partially located within the trim pocket 160. The trim pocket 160 may be located at an edge portion of the trim located adjacent the intermediate portion 120. The middle leg 156 may be entirely enclosed by the trim pocket 160 or there may be gaps in the trim pocket 160.

The trim pocket 160 may extend in a substantially continuous manner along the intermediate portion 120 as well as the upper portion 118 of the seat adjuster 114. In other embodiments, the trim pocket 160 may have gaps where the first side portion 150 is exposed. In some cases, the first side portion 150 may extend out of the trim pocket 160, such as at a rearward area of the upper portion 118.

The trim pocket 160 may be constructed of a material with a low coefficient of friction with respect to the trim compensator 144. The low coefficient of friction permits relative movement of the trim compensator 144 with respect to the trim pocket 160.

The middle leg 156 of the first side portion 150 may transition in an arc to an upper leg 158. As noted above, the upper leg 158 may be at least partially located within the trim pocket 160. The upper leg 158 may be generally parallel the lower leg 154. A portion of the upper leg 158 may be attached, such as sewn, to the trim fixed portion.

From the above, it may be appreciated that the upper leg 158, the middle leg 156 and the lower leg 154 may form a general C-shape for the first side portion 150.

The trim compensator 144 may provide a biasing force to the trim. The biasing force may be directed inward on the trim compensator 144, such as toward a mid-point between the upper leg 158, middle leg 156, and lower leg 154. The biasing force may assist in maintaining the trim 130 in a taut orientation.

The upper leg 158 may be attached to the fixed trim 130 through a trim selvedge 162, or an edge that prevents it from unravelling. The trim attachment section 164 may extend generally rearward where it may be attached to the frame or a fixed portion of the seat.

In accordance with the provisions of the patent statutes, the present device has been described in what is considered to represent its preferred embodiments. However, it should be noted that the device can be practiced otherwise than as specifically illustrated and described without departing from its spirit or scope.

| | |
|---|---|
| 100 | Seat System |
| 102 | Seat base assembly |
| 104 | Seat back assembly |
| 106 | Headrest assembly |
| 109 | Seat frame |
| 110 | Seat base frame portion |
| 112 | Cushion length adjustment assembly |

-continued

| | |
|---|---|
| 114 | Seat adjuster |
| 118 | Upper portion seat adjuster |
| 120 | Intermediate portion seat adjuster |
| 122 | Lower portion seat adjuster |
| 124 | Seat pan |
| 126 | Cushioning material |
| 128 | Seat bolsters |
| 130 | Seat trim |
| 132 | Trim adjuster |
| 134 | Trim flange |
| 136 | Retainer aperture |
| 137 | Trim aperture |
| 138 | Pin |
| 140 | Head portion |
| 142 | Body portion |
| 144 | Trim compensator |
| 146 | Connector portion trim compensator |
| 148 | Transition portion trim compensator |
| 150 | First side portion trim compensator |
| 152 | Second side portion trim compensator |
| 154 | Lower leg first side portion trim compensator |
| 156 | Middle leg first side portion trim compensator |
| 158 | Upper leg first side portion trim compensator |
| 160 | Trim pocket |
| 162 | Trim selvedge |
| 164 | Trim attachment section |
| 166 | Occupant |
| 168 | Occupant buttock portion |
| 170 | Occupant leg portion |
| 172 | Occupant back region |
| 174 | Occupant head |
| 176 | Occupant neck |
| 178 | Longitudinal axis |

What is claimed is:

1. A seat trim attachment system, comprising:
   a seat adjuster,
      wherein said seat adjuster is connected to a seat base frame to assist with fore and aft movement of a lower seat cushion,
      wherein said seat adjuster is comprised of an upper portion, an intermediate portion, and a lower portion,
   a trim adjuster,
      wherein said trim adjuster is comprised of one layer of a material capable of resuming its original shape spontaneously after contraction, dilation, or distortion,
   a trim flange,
      wherein said trim flange acts as a retainer and extends transverse to said lower portion and parallel to said intermediate portion,
      wherein said trim flange is comprised of apertures extending therethrough, and a trim compensator,
      wherein said trim compensator is comprised of a connector portion, transition portions, and first and second side portions,
      wherein said trim compensator maintains the trim taut with the fore and aft movement of the seat cushion,
      wherein said trim adjuster is partially extended about said trim flange such that it overlaps the apertures and folds around said trim flange.

2. The seat trim attachment system of claim 1, wherein said upper portion is parallel to a seat pan and extends downwardly to the intermediate portion in a curvilinear fashion, and the intermediate portion extends downwardly to the lower portion to complete a C shape.

3. The seat trim attachment system of claim 1, wherein said trim adjuster is connected to an end portion of a seat trim via high frequency welding, adhesive, sewing, and/or fasteners under said seat base.

4. The seat trim attachment system of claim 1, wherein said trim adjuster extends the length of said lower portion of the seat adjuster.

5. The seat trim attachment system of claim 1, wherein said trim adjuster extends or retracts when the length of said lower seat cushion is extended or retracted, respectively.

6. The seat trim attachment system of claim 1, wherein said apertures are equally spaced across the trim flange and are of equal size and shape.

7. The seat trim attachment system of claim 1, wherein said apertures are open to a top edge portion of said trim flange.

8. The seat trim attachment system of claim 1, wherein said connector portion is rigid to resist compression or expansion.

9. The seat trim attachment system of claim 1, wherein said connector portion extends parallel said trim flange and along the length of said trim flange.

10. The seat trim attachment system of claim 1, wherein said transition portions are connected to each end of said connector portion and extend downwardly toward said lower portion of said seat adjuster in a curvilinear direction.

11. A seat trim attachment system, comprising:
a seat adjuster,
wherein said seat adjuster is connected to a seat base frame to assist with fore and aft movement of a lower seat cushion,
wherein said seat adjuster is comprised of an upper portion, an intermediate portion, and a lower portion,
a trim adjuster,
wherein said trim adjuster is comprised of one layer of a material capable of resuming its original shape spontaneously after contraction, dilation, or distortion,
a trim flange,
wherein said trim flange acts as a retainer and extends transverse to said lower portion and parallel to said intermediate portion,
wherein said trim flange is comprised of apertures extending therethrough, and a trim compensator,
wherein said trim compensator is comprised of a connector portion, transition portions, and first and second side portions,
wherein said trim compensator maintains the trim taut with the fore and aft movement of the seat cushion,
wherein one or more pins, comprised of a body portion and a head portion, are selectively located through said trim adjuster and into said apertures to secure said trim adjuster to said trim flange.

12. The seat trim attachment system of claim 11, wherein a friction fit fixes said body portion to said apertures, allowing said trim adjuster to be secured between said head portion and said trim flange.

13. A seat trim attachment system, comprising:
a seat adjuster,
wherein said seat adjuster is connected to a seat base frame to assist with fore and aft movement of a lower seat cushion,
wherein said seat adjuster is comprised of an upper portion, an intermediate portion, and a lower portion,
a trim adjuster,
wherein said trim adjuster is comprised of one layer of a material capable of resuming its original shape spontaneously after contraction, dilation, or distortion,
a trim flange,
wherein said trim flange acts as a retainer and extends transverse to said lower portion and parallel to said intermediate portion,
wherein said trim flange is comprised of apertures extending therethrough, and a trim compensator,
wherein said trim compensator is comprised of a connector portion, transition portions, and first and second side portions,
wherein said trim compensator maintains the trim taut with the fore and aft movement of the seat cushion,
wherein said first side portion and said second side portion are comprised of lower, middle, and upper legs.

14. The seat trim attachment system of claim 13, wherein the lower leg of each side portion extends toward said intermediate portion of said seat adjuster and arc upward to said middle leg.

15. The seat trim attachment system of claim 13, wherein said middle leg of each side portion is at least partially located within a trim pocket and extends parallel said intermediate portion of said seat adjuster and are transverse said lower legs.

16. The seat trim attachment system of claim 15, wherein said upper leg of each side portion is at least partially located within said trim pocket and is parallel the lower leg.

17. The trim attachment system of claim 15, wherein each side portion has two fixed ends, allowing the rest of said side portion to move within said trim pockets.

18. The seat trim attachment system of claim 13, wherein said middle leg of each side portion transitions in an arc to said upper leg of each side portion, completing a "C" shape between said lower, middle, and upper legs of each side portion.

* * * * *